(12) United States Patent
Avagliano

(10) Patent No.: US 9,367,790 B2
(45) Date of Patent: Jun. 14, 2016

(54) PAYMENT CARD, RELATED READING DEVICE AND BRACELET COMPRISING THE PAYMENT CARD

(71) Applicant: Amadio Avagliano, Marcheno (IT)

(72) Inventor: Amadio Avagliano, Marcheno (IT)

( * ) Notice: Subject to any disclaimer, the term of this patent is extended or adjusted under 35 U.S.C. 154(b) by 0 days.

(21) Appl. No.: 14/412,122

(22) PCT Filed: Jun. 27, 2013

(86) PCT No.: PCT/IB2013/055275
§ 371 (c)(1),
(2) Date: Dec. 30, 2014

(87) PCT Pub. No.: WO2014/006547
PCT Pub. Date: Jan. 9, 2014

(65) Prior Publication Data
US 2015/0170016 A1     Jun. 18, 2015

(30) Foreign Application Priority Data

Jul. 5, 2012 (IT) .............................. BS2012A0101

(51) Int. Cl.
| | |
|---|---|
| G06Q 40/00 | (2012.01) |
| G06K 19/077 | (2006.01) |
| G07F 7/08 | (2006.01) |
| H01R 24/84 | (2011.01) |
| G06Q 20/34 | (2012.01) |
| G06Q 20/36 | (2012.01) |
| G06K 7/00 | (2006.01) |

(52) U.S. Cl.
CPC ........ *G06K 19/07743* (2013.01); *G06K 7/0056* (2013.01); *G06K 7/0065* (2013.01); *G06K 19/07707* (2013.01); *G06K 19/07709* (2013.01); *G06K 19/07733* (2013.01); *G06K 19/07762* (2013.01); *G06Q 20/341* (2013.01); *G06Q 20/3415* (2013.01); *G06Q 20/367* (2013.01); *G07F 7/0833* (2013.01); *G07F 7/0846* (2013.01); *G07F 7/0853* (2013.01); *H01R 24/84* (2013.01)

(58) Field of Classification Search
None
See application file for complete search history.

(56) References Cited

U.S. PATENT DOCUMENTS

| | | | |
|---|---|---|---|
| 2002/0138444 A1* | 9/2002 | Granfeldt | G06Q 20/341 705/65 |
| 2007/0174615 A1* | 7/2007 | Ballou, Jr. | G06F 21/606 713/168 |

(Continued)

FOREIGN PATENT DOCUMENTS

| | | |
|---|---|---|
| EP | 1369829 A2 | 12/2003 |
| EP | 1739564 A1 | 1/2007 |

(Continued)

*Primary Examiner* — Olabode Akintola
(74) *Attorney, Agent, or Firm* — Volpe and Koenig, P.C.

(57) ABSTRACT

A payment card comprises a supporting body with a controller provided with an inner memory in which identification data of a user and the issuing institution are stored. In addition the card provides a connection interface combined with the controller for the connection with an outside device. The connection interface is a connection port incorporating a male portion and a female portion arranged, one with respect to the other, according to a specific layout rendering such a port a "hermaphrodite" port, that is able to couple with a port having an identical geometry. The connection port further comprises a plurality of electric contact elements combined with the male portion and/or the female portion. A method referring to virtual transfer of money between two payment cards is further described.

8 Claims, 15 Drawing Sheets

(56) References Cited

U.S. PATENT DOCUMENTS

| | | |
|---|---|---|
| 2009/0037275 A1 | 2/2009 | Pollio |
| 2009/0078777 A1* | 3/2009 | Granucci ............ G06Q 20/105 235/492 |
| 2009/0112761 A1 | 4/2009 | Robertson |
| 2009/0146947 A1 | 6/2009 | Ng |
| 2011/0147452 A1 | 6/2011 | Ho |
| 2012/0024945 A1 | 2/2012 | Jones |

FOREIGN PATENT DOCUMENTS

| | | |
|---|---|---|
| KR | 20040012379 A | 2/2004 |
| WO | 0173698 A2 | 10/2001 |

* cited by examiner

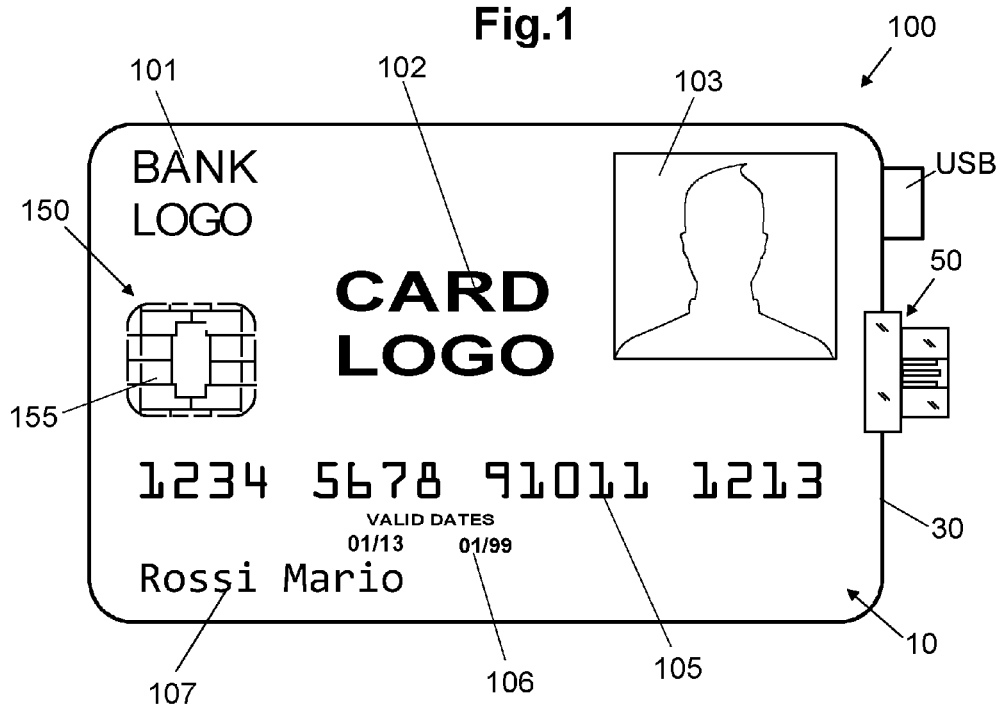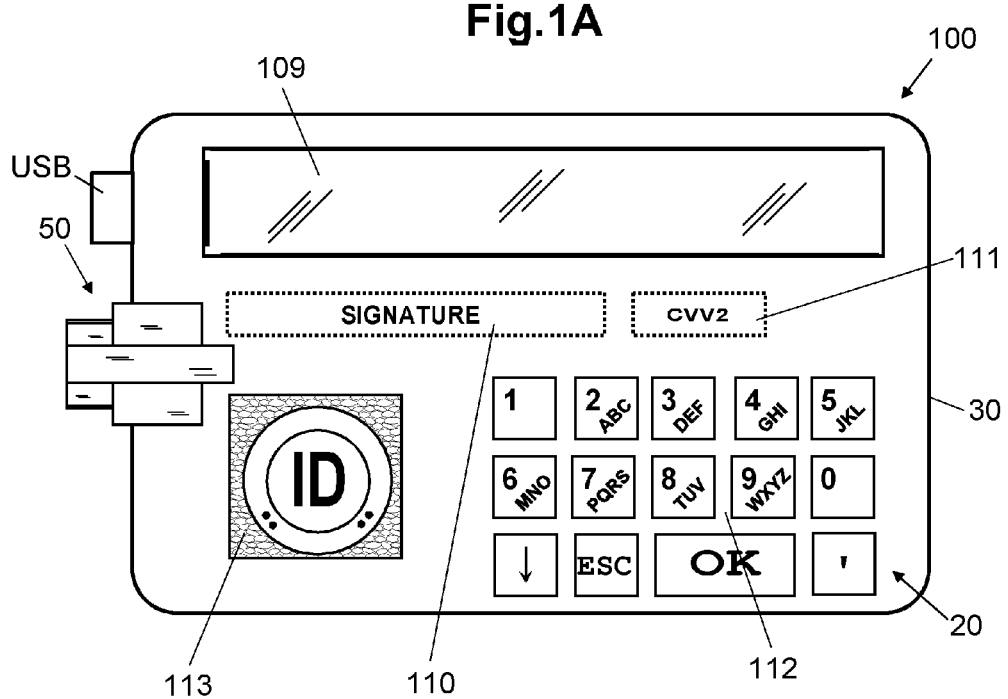

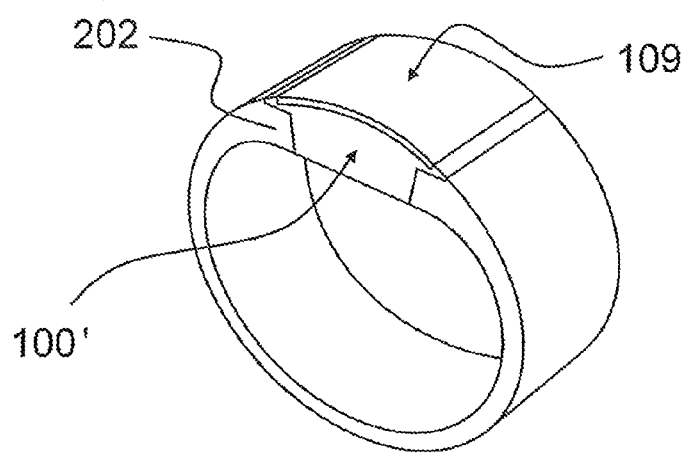
FIG. 16
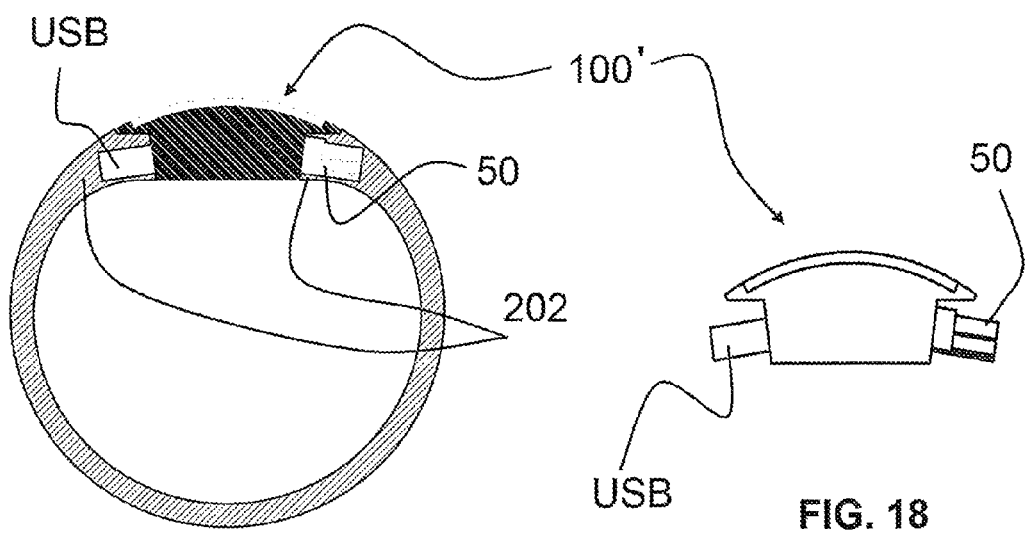
FIG. 17
FIG. 18

PAYMENT CARD, RELATED READING DEVICE AND BRACELET COMPRISING THE PAYMENT CARD

FIELD OF THE INVENTION

The present invention refers to a payment card, such as a credit card, an ATM or a reloadable card and to a method to manage a bank transaction by means of this payment card.

Furthermore the invention relates to a device for reading the afore said payment card and to a wearable bracelet provided with the above payment card.

BACKGROUND OF THE INVENTION

As known, payment cards are electronic cards, spread all over the world, that allow purchases of goods and services. In particular, the payment cards are equipped with a device for the recognition of identification data of the owner and issuing bank, able to connect with an interface device, such as a POS (Point of Sale), to make a payment, or with an Automatic ATM (Automatic Teller Machine) for drawing out cash or carrying out another operation.

In particular payment cards are cards made of plastic material and incorporating a microchip in which the data concerning the card owner are securely stored. These payment cards are called Smart Card. Information stored in the microchip allow to make money transaction. With an increased memory capacity and the internal microprocessor, smart cards can be used to perform multiple services, in fact, a greater number of data can be stored on the same card. The microchip has supplanted the magnetic stripe, previously used for this type of cards.

Cards with RFID (Radio Frequency Identification) technology associated with respective RFID readers are also known, even those assigned for different functions.

A real need of the users is to check important information in real-time about the use of the card and about the transaction one is performing by using the card itself, such as information about available credit, transaction history, etc. To do this payment cards have been implemented that include a display and an interface keyboard, through which the user can access the functions of the card itself, such as described in US patent application n. US 2012/0024945.

A further need arose from the use of payment cards is that they can be connected directly to a Computer, Laptop Computer, Smartphone, mobile phone, PDA or other device through a connection interface. US 2009/037275 describes a payment card that implements an USB (Universal Serial Bus) port. Another example of this type is provided in US 2011/147452.

The document US 2009/112761 describes a card equipped with an USB port for connecting to a PC. The card allows the user to identify himself in the banking system, in order to subtract or deposit money.

The described solutions do not permit a direct data exchange from a credit card directly to another credit card if not through a connection to a remote controlling server, generally the server of the bank that issued the two cards, the latter having still to be traceable to the same checking account.

This function is particularly useful when, for example, it is necessary to accredit or directly reload a payment card through another payment card without going through a specific request, for example, by an interface page with a central server of the bank issuing the card.

Today there is the need to have a direct connection between the two payment cards in addition or alternatively to the connection with the remote server of the Institution managing at least one of the cards.

SUMMARY OF THE INVENTION

It is therefore an object of the present invention to provide a payment card that allows to perform a direct exchange of data with another equivalent payment card.

It is also an object of the present invention to provide a payment card that is simple and practical to use, and possibly also wearable for added convenience.

It is another object of the present invention to provide a payment card that can be interfaced with most of electronic devices.

It is an additional object of the present invention to provide a reading device of the afore said payment card that is reliable and constructively simple to implement.

It is still an object of the present invention to provide a payment card that, in addition to have the advantages above, can be easily transported and used as a device for personal identification.

It is still an object of the present invention to provide a method for managing bank transactions by means of said payment card.

The objects above are obtained by a payment card according to claim 1.

In particular, the payment card comprises a supporting body having a first and a second face opposite to each other. Moreover, it provides a controller, associated with the supporting body, equipped with an internal memory in which the identification data of a user and the institution issuing the payment card are stored. In addition the card provides a connection interface combined with the controller for the connection with an outside device. The connection interface is a connection port incorporating a male portion (plug) and a female portion (receptacle) arranged, one with respect to the other, according to a specific layout that will be now described and rendering de facto such a port a "hermaphrodite" port, that is able to couple with a port having an identical geometry.

The connection port further comprises a plurality of electric contact elements combined with the male portion and/ or the female portion.

In other words, the connection interface combines in a single port a male portion and a female portion, physically separated and distinct but arranged according to a configuration that allows the functional coupling with, respectively, a female portion and a male portion of an equivalent port of an outside device, for example a second payment card according to the invention.

Therefore the term "hermaphrodite" means suitable for connecting with a port itself that has an identical geometry and conformation. In particular, the shape coupling between a first and a second connection port, according to the invention, determines the insertion simultaneously between the male portion of the first connection port with the female portion of the second connection port and the female portion of the first connection port with the male portion of the second connection port.

It is therefore not necessary to provide ports of any different geometry to connect two connection interfaces of this type. It is therefore possible to connect the payment card with an outside device, for example a reading device or another device that implements a connection interface of the type described above. The term "outside device" means such as a reader, computer or the like, or a further payment card that implements the afore said interface connection.

In case of connection with another payment card this connection is performed by rotating by 180° one of the two payment cards, in such a way as to match the respective male and female portions of a first connection port with the female and male portions of the other connection port. In this way the ports are morphologically and mechanically identical and complementary at the same time, being able to interpenetrate. In this way a data exchange is possible directly between two payment cards so that some data, chosen according to the needs, can be directly transferred from one card to another even in an off-line mode and then without a connection to an external and remote controlling server. A data update with a controlling server will be carried out at a later time once a connection with the latter has been established.

Preferably, the payment card is a plastic material card with a predefined size, having a first and a second face opposite to each other. The connection interface is disposed on an edge of the payment card.

In a preferred embodiment, the connection port includes a support portion from which the male portion and the female portion extend. The supporting portion also acts as a connection for connecting to an edge of the payment card.

A preferred layout provides the male portion and the female portion to be superimposed and aligned with respect to a common median plane, which is a plane of symmetry too.

Preferably, the connection interface comprises guide means for guiding a male portion of another connection port. These means act as a reference to aid the user in a quick and easy connection between two connection ports.

The female portion is substantially box-shaped and includes a plurality of side walls forming a polygonal, preferably rectangular or square, housing seat.

The male portion preferably comprises a single piece of shape substantially complementary to the female portion with which it forms a shape coupling.

Preferably, the guide means comprise a docking portion with "T" profile formed on the male portion, which engages an opening, which extends longitudinally, formed in a head wall, opposite to the bottom wall, of the female portion. With the expression longitudinal direction is indicated a direction parallel to the afore said median plane. In other words, the "T"-shaped docking portion slidingly engages within the opening obtained in the wall of the female portion and it allows to guide precisely and quickly the complete coupling of each connection port. Furthermore, the "T" portion maintains a stable connection between two connection ports as the wings of the "T" profile are superimposed with respect to the external wall of the head of the housing seat.

In a preferred embodiment the electric contact elements are arranged on a bottom wall of the housing seat of the female portion, opposite to the head wall.

The electric contact elements are, in a preferred embodiment, a plurality of thin plates, henceforth defined pins, having an elongated shape and spaced one from another by a step established in the construction step, so as to connect correctly when the connection port is joined with the other connection port of the connection interface of a second card. Preferably there are seven pins.

In a preferred arrangement, the connection port with seven pins implements the pattern of electrical contacts normally provided in USB (Universal Serial Bus) ports, i.e. the scheme with four BUS. In this way the port according to the present invention allows the connection between two payment cards without the use of cables or adapters, and it allows the connection with other outside hardware devices, such as a PC, a notebook, etc., possibly through an appropriate adapter that allows its functional coupling with the USB port of these equipment.

The four-pin configuration also allows to exploit the connection port for the power supply of the components of the card that may need electrical power, for example a buffer battery, a display, etc.

In a preferred embodiment the payment card comprises, in addition to the hermaphrodite port, also an USB port of a traditional type for the interface with all the devices supporting this type of connection.

In a preferred embodiment, the controlling means include a processing unit, microchip or CPU arranged on the first face of the payment card. In addition, on the first face identification data of the payment card and/or issuing institution and/or owner data and/or validity data are imprinted.

The processing unit has to carry out operations given by the user through interaction with the alphanumeric keyboard and made accessible through a display or a communication with other outside hardware devices, with the connection by means of the afore described port, and/or with wireless connections for which the card is appropriately prepared.

On the second face a display is provided. In a preferred arrangement, the display is a LCD which ensures high flexibility and energy saving. Alternatively, the display can be a touch screen. The display can be equipped with signaling lights, for example a colored LED, or one or more symbols, used to visually signal error card conditions, or for example a situation of dried up credit or successful/unsuccessful attempts of connection and/or charge.

In a preferred embodiment, the payment card provides an alphanumeric keyboard arranged on the second face of the payment card combined with the display.

Preferably, the memory of the controller is an MMU (Memory Management Unit) having to preserve data and information for the functioning of the payment card, for example data relating to the transaction history etc., but also to contain programs specifically for data protection.

In particular, the MMU is associated with a ROM memory (Read Only Memory).

Still in a preferred arrangement, one or more EEPROM (Electrically Erasable Programmable Read-Only Memory), FLASH EEPROM or FRAM (Ferroelectric Random-Access Memory) are provided in association with the MMU memory.

In addition, also a RAM (Random-Access Memory) memory is provided in association with the MMU.

In a preferred arrangement, the controller provides a computing unit for the CRC (error-detecting code), which detects anomalies in individual data/programs stored in the memory unit.

Still preferably, a RTC (Real Time Clock) component is provided, which allows the controller to have always available, even in standby mode, a hardware clock not software-packable, preferably with a quartz technology having low energy consumption. In this way it is possible to obtain, for example, the generation of One-Time password and other applications.

Preferably, the controller also provides a Clock Generator and a Clock Filter used for the synchronization and connection during the transmission of data. In the preferred arrangement, a PLL (Phase-Locked Loop) is also included in association with the Clock Filter.

The controller also includes a 16 or 32 bits timer and a watchdog time.

In the preferred arrangement of the card, the controller also includes a RNG (Random Number Generator) used to generate authentication keys for the outside device, but RNG is also used as an additional useful data to certify the authenticity and the belonging of the card during the card to card transaction.

Preferably, the card includes a component UART/USART, short for Universal Asynchronous Receiver/Transmitter (UART) and Universal Synchronous/Asynchronous Receiver/Transmitter (USART) to convert data from a parallel format into an asynchronous serial format or vice versa.

Preferably, the card is also equipped with means for wireless connection to outside devices, such as WiFi, Bluetooth or RFID/NFC (contactless).

Preferably a power source for the operation of the controller, the display, and the alphanumeric keyboard is provided. The power source is preferably a rechargeable battery of Lithium Polymer Ultrathin Cells type.

The connection port described above can also be used in other fields, i.e. on devices different from a payment card and for this reason the Proprietor reserves the right to file a divisional patent application only for the "hermaphrodite" connection port.

For example, if the card is equipped with keyboard and display, it is possible to make an on-line purchase as now described. Through a PC or an equivalent device you can connect to the website from which you want to make your purchase. The payment card is connected to the PC via hermaphrodite connection port or through the wireless connection, such as of RFID/NFC type. The section of the website dedicated to the payment is accessed; at this point the website performs an identification/authenticity analysis of the payment card. Using the keyboard of a payment card the user enters the PIN code of the card itself and the amount to be transferred to the website provider. The transfer of money is confirmed by pressing a confirmation button on the keyboard. The transaction is carried out and the residual credit is still visible on the card display and it is automatically updated on the server of the institution issuing the same.

According to a further aspect, the present invention relates to a bracelet that incorporates the payment card described above, in any constructive variation. The bracelet includes a strap for the fastening to the wearer wrist and an accommodating seat for the payment card. For example the payment card can be is inserted in a removable way in the respective seat, so as to be visible as the face of a clock on the respective strap. This embodiment is particularly convenient because it allows the user to extract and use the payment card from the strap without having to open the clothing pockets, and without having to insert the card in a traditional wallet. In addition, in circumstances wherein the payment card is used as a personal identification device, the bracelet allows you to use the card as a badge. This arrangement further allows to associate with the card batteries of size comparable with those of the batteries of the watches, thus sufficient to supply a display, a keyboard, and if present, a wireless interface.

According to a further aspect, the present invention relates to a key ring that incorporates the payment card described above, in any constructive variation. According to additional aspects, the present invention relates to a necklace, a belt, a watch, a mobile phone, a tablet, etc. provided with a payment card as described above. Another aspect of the invention relates to a method for managing a banking transaction between two payment cards, preferably but not necessarily of the type described in relation to the first aspect of the invention, both equipped with a memory and means for the wireless connection and/or equipped with a hermaphrodite port.

For the method described below the Applicant reserves the right to file a divisional patent application or prepare a corresponding set of claims.

The method provides the steps of:
connecting the two payment cards one to another through their respective wireless connection means, such as RFID or NFC type, or through their respective hermaphrodite ports;
exchanging data between the two cards corresponding to the money sum transfer from the transferring card to the recipient card;
storing the exchanged data in the memories of both the cards and storing a security data packet;
storing the credited amount in the memory of the recipient card and making available such amount in the future only if the following condition occurs:
at least one from the recipient card or the transferring card must be connected to the server of the related issuing institution that validates the money transfer, i.e. that records the transaction.

The validation of the institute is important to avoid that money credited on a card and coming from a previous card-to-card money exchange can be transferred to subsequent beneficiaries without a trace of such exchange transactions on the server of the institution itself, in this way creating both a problem with transparency and anti-money laundering rules, and purely accounting problems that may occur due to not traced money transfers.

The connection to the server can also be done at the first on-line transaction made with the recipient card after the accreditation from the second card, for example in case of shopping on-line or at shopkeeper with POS reader.

For example, as long as the institution has not validated the transfer, the credited amount is stored in a special 'pending transactions' section of the recipient card, and possibly indicated as such to the user if the card has a display. When the issuing institution has the opportunity to validate the transfer, the credited amount is stored in a special 'available credit' section of the recipient card, and possibly indicated as such to the user if the card has a display.

It is also important to note that methods to perform off-line transactions are already known, such as using a POS disconnected from the central server, it is true that these operations are envisaged only for what concerns the card-POS payments and to date there are no for card-card payments of the kind described above.

The method according to the present invention makes the payment method able to perform operations, such as the exchange of data/money, in compliance with anti-money laundering, antitrust and transparency regulations in force in major countries. Thereby the transaction between two cards, even performed off-line, remains only temporarily and becomes definitive after a validation by the institution of one of the two cards (which can be the same).

Preferably the payment card used to implement the method described above is a payment card or a bracelet according to any one of claims 1-14.

Preferably the connection of a payment card according to the present invention with a remote server of the issuing institution and/or with a second card is implemented as follows. Once the connection has been established between the card and the server, the latter performs a check of authenticity. The controlling server on the basis of a positive check of the authenticity authorizes the transaction by the payment card. Then the controlling server sends an updating signal to change the residual credit stored in the memory of the payment card visible on the display of the card itself, if present.

In particular, the connecting step occurs, in a possible embodiment, by means of an outside device through the hermaphrodite connection port. Subsequently the step of sending, through the outside device, the identification data of the payment card to the remote controlling server, is provided.

In particular, the authenticity check between payment card and outside device provides that: if the test fails a signaling element, for example a LED present on the payment card, generates an error signal and the subsequent connection step is interrupted. If the test is successful the signaling element generates a positive signal and allows the subsequent connecting step.

More in particular the checking step includes a step of data authentication which consists of a cryptographic checksum of Static Data Authentication (SDA), or Dynamic Data Authentication (DDA), or still Combined Data Authentication, type.

In a first embodiment the outside device is a reader, preferably a POS or ATM.

In a second solution, the outside device is an additional payment card called "recipient card". In the latter case, we can distinguish a "paying card" and a "recipient card" connected to each other by means of their interfaces.

In a preferred way, it is provided a step of entering an access code using the alphanumeric keyboard of the paying card, preferably a PIN (Personal Identification Number) code and typing a cash amount to be transferred in favor of the recipient card, to which a step of confirming and authorizing the transfer follows.

In a preferred embodiment the method of card-to-card payment provides an authenticating step through a control of Application Cryptogram Generation (AC) type and also uses an OTP (One Time Password).

According to an alternative mode, the method is even practicable by using two payment cards that support a NFC/RFID mutual connection.

Alternatively, the payment card connects to the central server using an independent data connection (Mobile connection) or Wi-Fi technology without the aid of an outside device. Then, in this particular case, the payment card is always connected to the server and it updates all data in real time (i.e. ON-LINE), by recording the pending transactions and data passing from one card to another.

According to a further aspect of the invention a reader of a payment card according to the invention is described, comprising a processing unit adapted to interact with a controller provided on said payment card. The reader comprises a connection port according to the present invention.

In addition to what above described, the connection port of the reader is defined by a housing seat in which the payment card with provided with the connection interface is inserted.

The housing seat provides the connection interface arranged on a bottom wall of the same in such a way that the housing seat acts as a guide for a proper connection.

Preferably, the reader also comprises a component selected from the group including: an analog modem, an Ethernet/LAN connection, a wireless antenna, a SIM card, a USB port or a combination thereof.

The reader is preferably provided with an external power supply through a cable. In combination or alternatively the reader provides an internal rechargeable battery.

The reader allows to perform some functions such as recharging the battery, entering pending transactions, system software updates of the payment card. In a preferred arrangement of the present invention the reader comprises one or more displays associated with one or more alphanumeric keyboards.

The reader is also associable to a printer.

The reader may also comprise a port for a payment card of the shopkeeper through which it is possible to transmit the payment directly from the user card to the shopkeeper card.

In a preferred embodiment the reader comprises a main module equipped with the connection interface, and secondary modules can be connected to the main module through said connection interface.

In particular two secondary modules connected on the side opposite to the main module are provided.

The secondary modules include a display and an alphanumeric keyboard associated with the display. Alternatively, the display is a touch screen.

LIST OF THE DRAWINGS

Further characteristics and advantages of the present invention will be more evident from a review of the following specification of a preferred, but not exclusive, embodiment, shown for illustration purposes only and without limitation, with the aid of the attached drawings, in which:

FIG. 1 shows a plant view of a first face of a payment card, according to the invention.

FIG. 1A shows a plant view of a second face of the payment card of FIG. 1;

FIG. 16 is a perspective view of a bracelet according to the present invention;

FIG. 17 is a sectional view of the bracelet shown in FIG. 16;

FIG. 18 is a sectional view of a detail of the bracelet shown in FIG. 16.

DETAILED DESCRIPTION OF THE INVENTION

Figure 5:
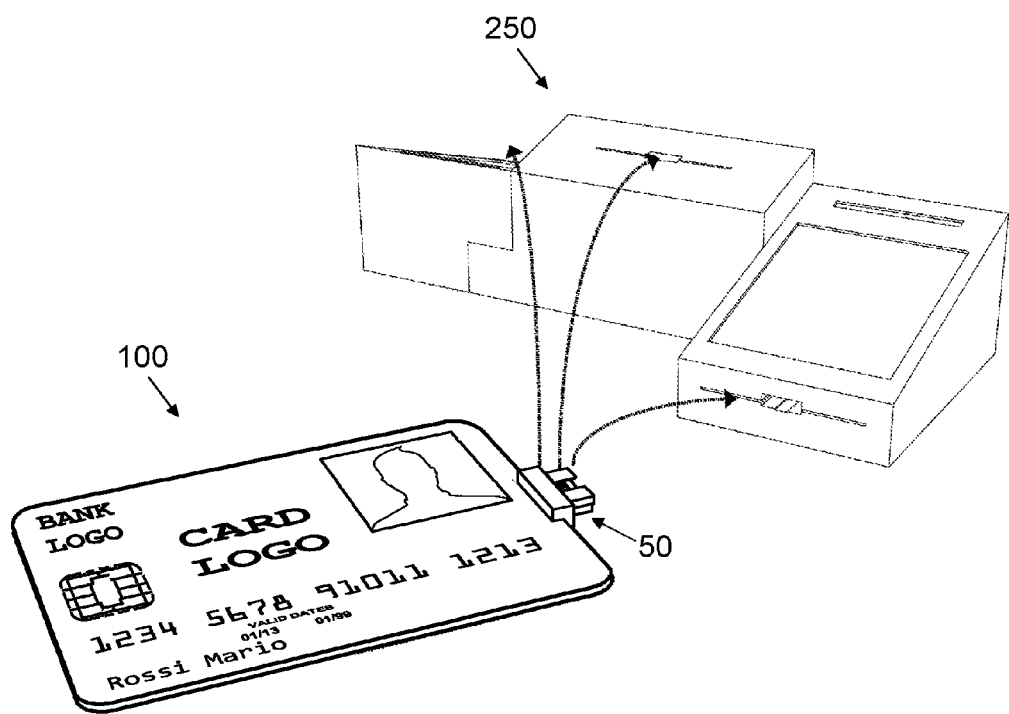
FIG. 5 shows a schematic view of the connection between the payment card and a station, such as a reader.
Figure 6:
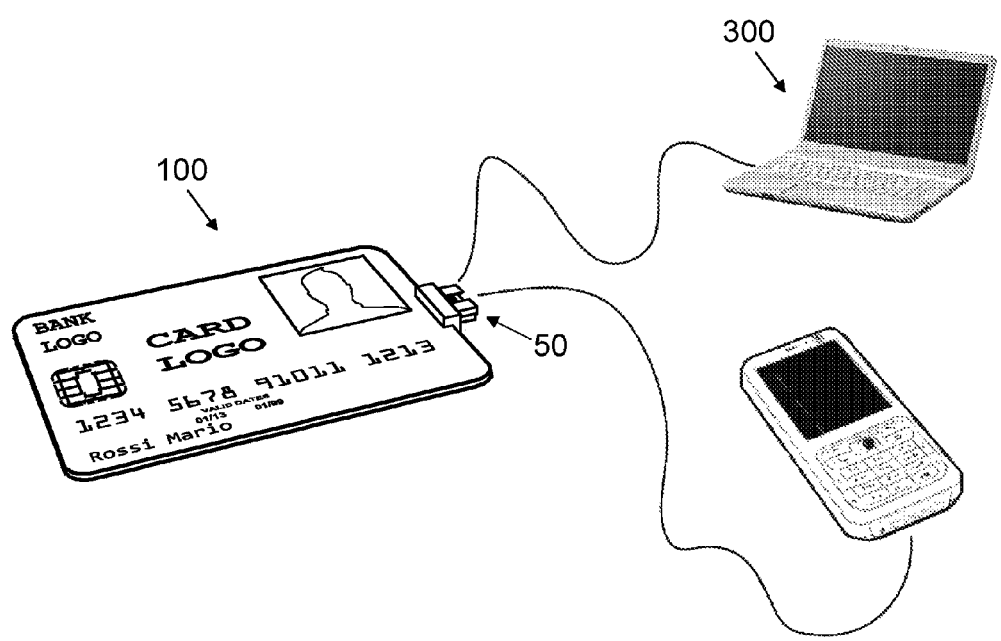
FIG. 6 shows a schematic view of the connection between the payment card and an outside device such as a computer or a smartphone.

Referring to FIGS. 1 and 1A it is represented a payment card 100, according to the invention, comprising a supporting body 30 preferably made of plastic material having a first 10 and a second face 20 one opposite to another. Integrated to the supporting body it is provided a controller 150, shown in a schematic way, provided with an inner memory in which identification data of a user and/or the institution issuing the payment card 100 are stored. In addition, the payment card 100 comprises a connection interface 50 for the connection with at least one outside device, shown in FIGS. 5, 6 and 8, combined with the controller 150.

Figure 2:
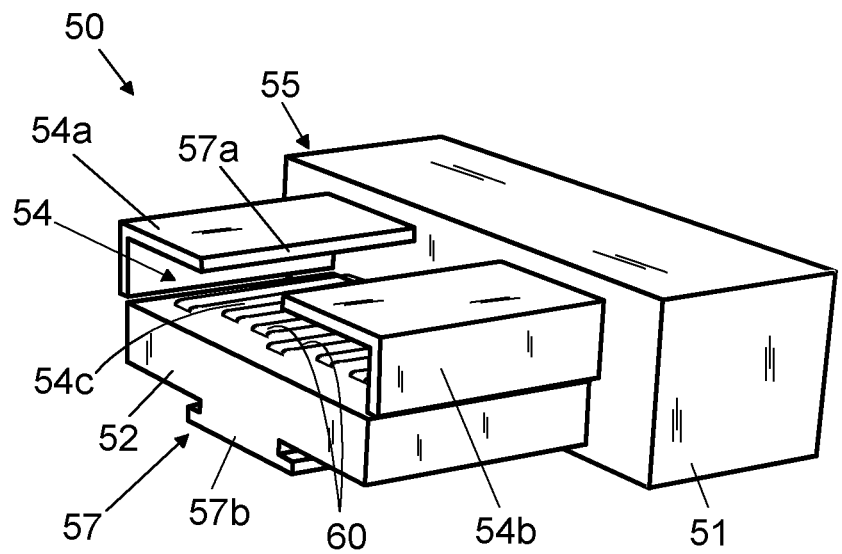
FIG. 2 shows a perspective view of a connection interface implemented on the payment card.
Figure 2A:
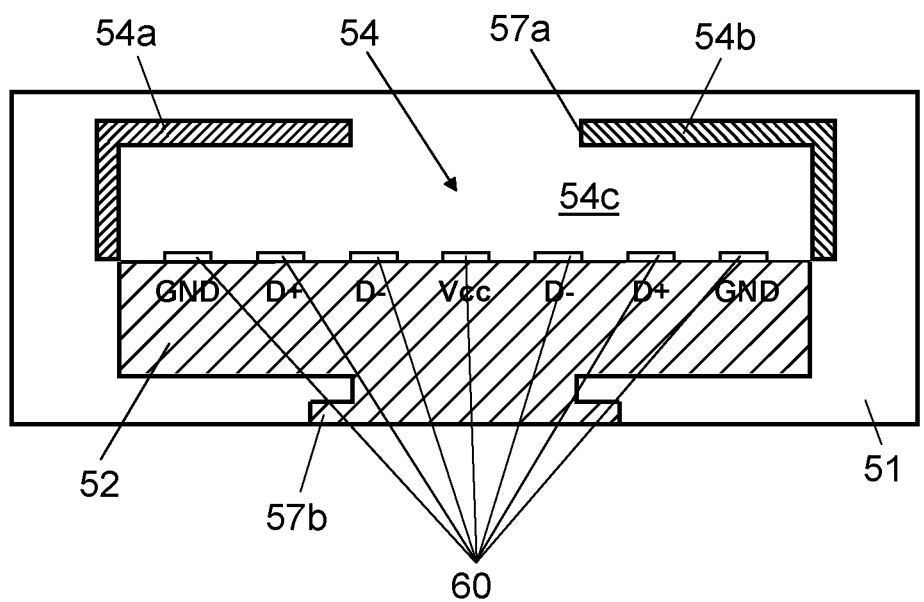
FIG. 2A shows a sectional view of the connection interface of FIG. 3.

In particular, as best shown in FIGS. 2 and 2A, the connection interface includes a connection port 50 which comprises a male portion 52 (plug) and a female portion 54 (receptacle) disposed, one with respect to the other, according to a specific layout. The connection port 50 further comprises a plurality of electric contact elements 60 (FIG. 2A) combined with the male portion 52 and/or the female portion 54.

More in particular, such a connection port 50 can be defined as "hermaphrodite", i.e. able to couple, reversing the position of the male portion 52 and female portion 54, with a port having identical geometry and conformation.

Thus the male portion 52 and female portion 54 are distinct and physically separate. With portions distinct and separate it is meant that the two male 52 and female 54 portions do not result in any embodiment according to the invention, integrated one respect to each other, i.e. the male portion 52 is not obtained in the inner space defined by the female portion 54, but it is always outside of the latter.

Figure 8:
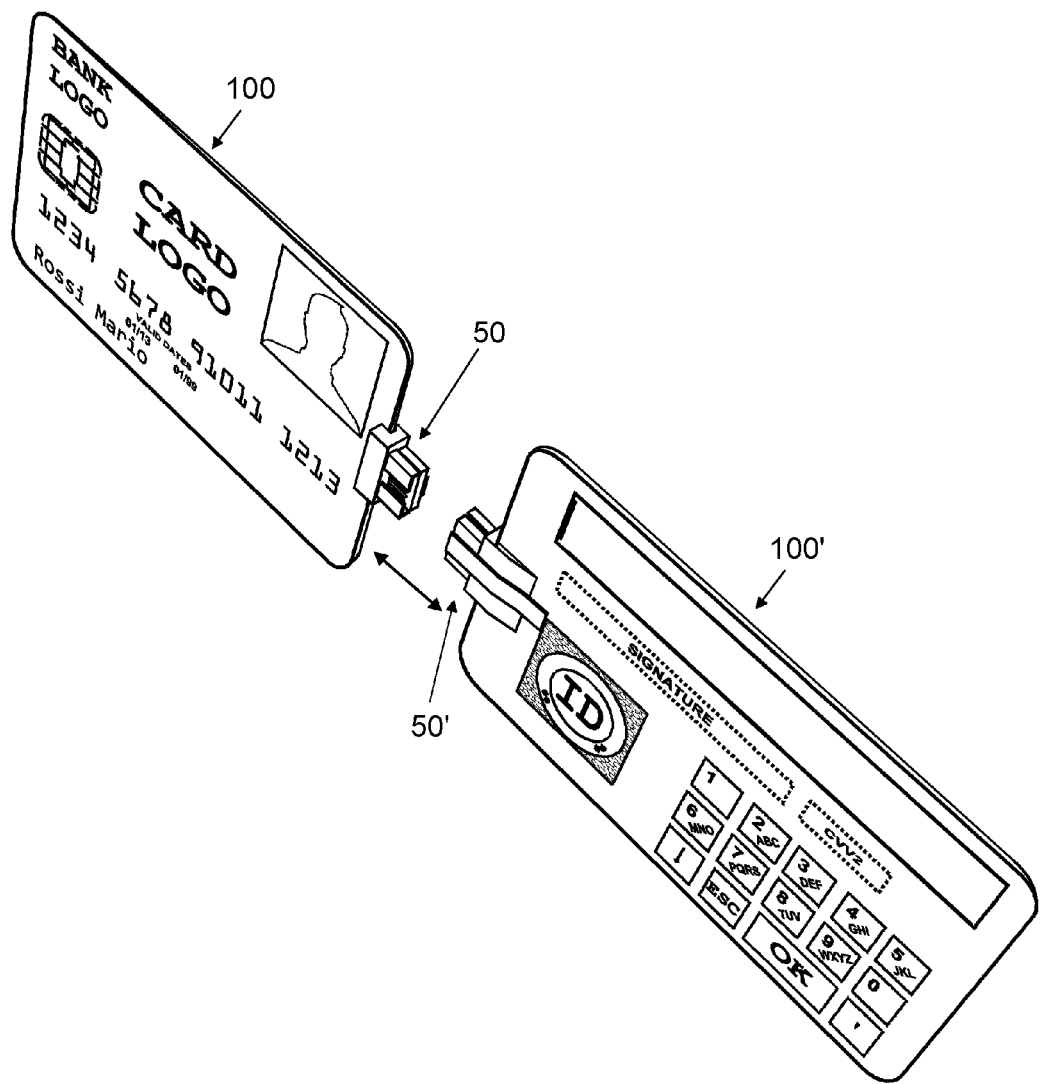
FIG. 8 shows a perspective view of a first and second payment card connected to each other through the connection interface of FIG. 3.

On the contrary, the male portion 52 and female portion 54 are arranged in a configuration that allows the functional coupling with a female portion 54 and a male portion 52 of a connection port 50 equivalent to an outside device, for example a second payment card according to the invention, as shown in FIG. 8.

Figure 3:
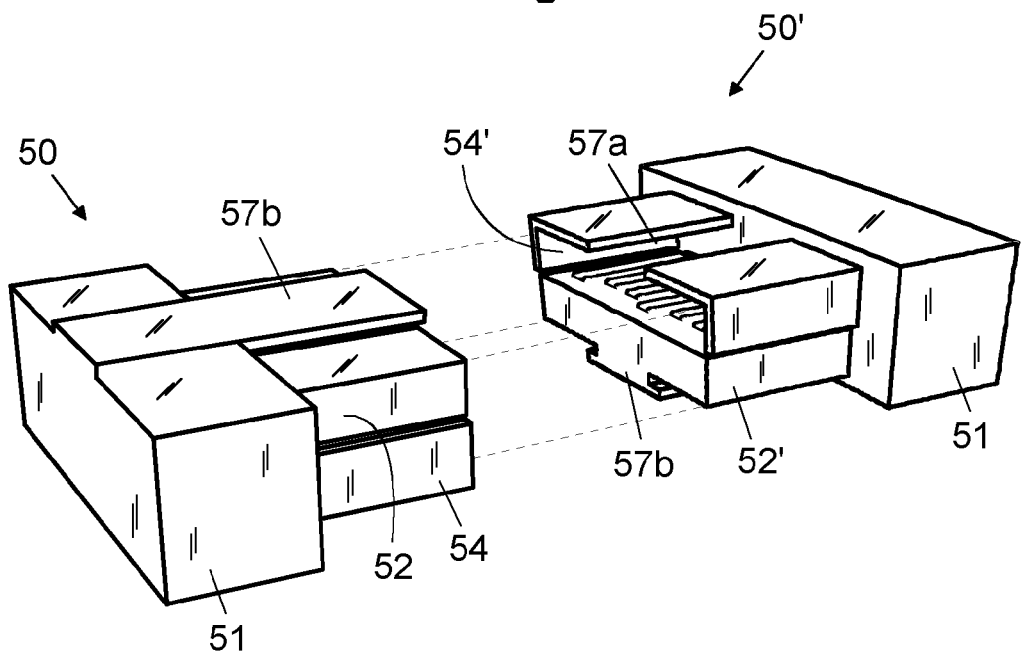
FIG. 3 shows a perspective view of a first and a second connection interface during their connection.

In particular, the shape coupling between a first 50 and a second 50' connection port, as shown in FIG. 3, provides a simultaneous coupling between the male portion 52 of the first connection port 50 with the female portion 54' of the second connection port 50' and the female portion 54 of the first connection port 50 with the male portion 52' of the second connection port 50'.

Constructively, the connection port 50 comprises a supporting portion 51 from which the male portion 52 and female portion 54 extend. The supporting portion 51 also serves as attachment for the connection with an edge of the payment card 100 between the first 10 and the second 20 faces. A preferred layout provides the male portion 52 and female portion superimposed and aligned one to another with respect to a common median plane, which is a plane of symmetry as shown in FIGS. 2 and 2A.

Specifically, the female portion 54 has a substantially box-shaped form and includes a plurality of side walls 54a, 54b that form a polygonal, preferably rectangular or square, housing seat 54c. On the contrary the male portion 52 comprises a solid portion with a shape complementary to that of the housing seat 54c.

Also, the connection port 50 comprises guide means 57 for guiding the connection with an additional connection port 50' having the same geometry (FIG. 3). In this way, through a mechanical guide a reference is obtained, as well as a stability, in the connection between the two connection ports 50, 50', facilitating the user.

In particular, the guide means 57 comprise a docking portion 57b with a "T" profile formed on the male portion 52, which engages an interlocking opening 57a, which extends in the longitudinal direction. The interlocking opening 57a is formed in a wall of the female portion 54. More particularly, the female portion 54 is composed of a pair of side walls 54a and 54b opposite to each other with a substantially "L"-shaped profile which define between them the interlocking opening 57a.

The "T"-shaped docking portion 57b slidingly engages in the interlocking opening 57a formed on the female portion 54 and allows to precisely and quickly guide the complete coupling of each connection port 50.

Figure 3A:
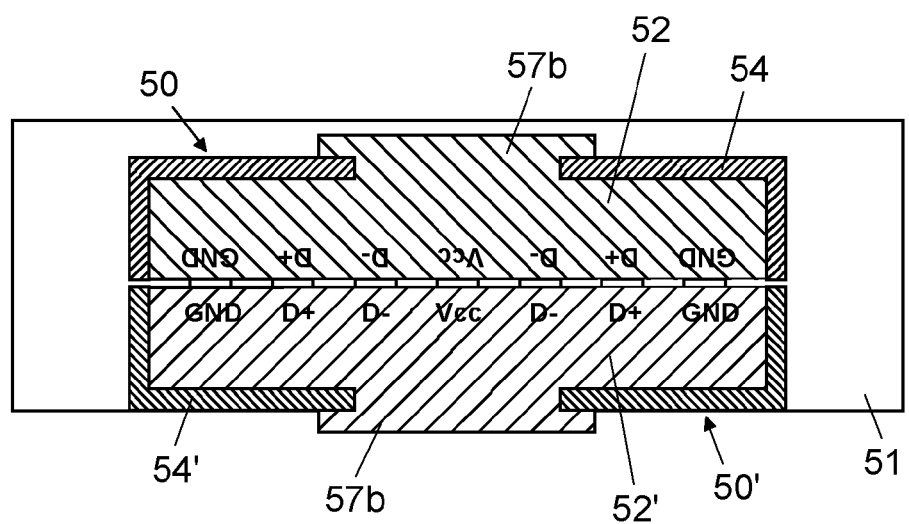
FIG. 3A shows a sectional view of the first and second connection interface connected to each other.

Moreover, as shown in FIG. 3A, the "T"-shaped docking portion 57b keeps the connection stable between two connection ports 50, 50' as the wings of the "T"-shape profile are partially superimposed with respect to the external wall 54a, 54b of the housing seat 54c of a respective female portion 54.

In a preferred embodiment, as shown in FIG. 2A, the electric contact elements 60 are arranged on an intermediate wall 54d between the female portion 54 and the male portion 52, so as to be defined as the bottom wall of the female portion 54 or the external wall of the male portion 52.

The electric contact elements 60 are, in particular, a plurality of thin plates or pins, with elongated shape and spaced apart by a determined step p defined in the construction step, so as to connect correctly when the connection port 50 is joined with another connection port 50' (FIG. 3A). More in particular seven pins are provided positioned so that the electrical contacts will match once one of the two connection ports rotated by 180°. So a correct join between the pins transmitting the same type of signal, occurs.

In a preferred arrangement, the connection port 50 implements a set of pins that allow to obtain a pattern of electric contacts usually provided in USB (Universal Serial Bus) ports, i.e. the four-BUS scheme. In other words, the connection port 50 uses the same serial protocol of any USB port as the pairs of duplicated pins 60 (GND/D+/D−) are subsequently reunited and in this way reduced to three, which together with the single Pin Vcc, lead back to four as in USB standard. With regard to individual electric contacts, GND electrical contact performs the task of providing a common grounding reference between the upstream and downstream data ports (D+/D−). The data Pins D+/D−, by using serial USB protocol, transfer data in packet mode (packet data). The Vcc (Vbus) performs the task of powering the devices connected thereto with a 5v DC (±5%) voltage at 500/900 mA.

In fact the four-pin configuration also allows to exploit the connection port 50 for the power supply of the components of the payment card itself that may need electrical power, for example a buffer battery, a display, etc., as after described. In particular, an internal battery of the card, as described later, is loaded (or powered) through the Vbus of connection port by the connection with an outside device (PC, netbook, reader and the like).

Such a connection port 50 according to the present invention then allows the direct connection between two payment cards 100, 100' without the use of cables or adapters, and it allows the connection with other outside apparatuses or devices, such as a PC, a notebook, etc., possibly through an appropriate adapter that allows its functional coupling with the USB port of these equipments.

It is therefore possible to connect the payment card 100 with an outside device, for example a reading device or another device that implements a connection interface of the type described above. The term "outside device" means such as a reader 250 (FIG. 5), computer 300 or the like (FIG. 6), or a further payment card 100 (FIG. 8) that implements the aforesaid interface connection. For simplicity the USB port of the card 100 has been omitted in FIGS. 5, 6 and 8.

In case of connection with another payment card, as shown in FIG. 8, this connection is performed by rotating by 180° one of the two payment cards, in such a way as to match the respective male 52 and female 54 portions of a first connection port 50 with the female 54' and male 52' portions of the other connection port 50'. In this way the ports are morphologically and mechanically identical and complementary at the same time, being able to interpenetrate.

The direct connection of the two cards as described below allows to obtain a direct transfer of data, chosen according to the needs, from one card to another even in off-line mode and then without connection to a remote controlling server.

Referring to FIGS. 1 and 1A, the controller includes a processing unit, microchip or CPU 155 arranged on the first face 10 of the payment card. In addition, on the first face 10 and second face 20 identification data 105, 111, 113 of the payment card and/or issuing institution 101 102 and/or owner data 103, 107 and/or validity data thereof 106, are imprinted.

On the second face 20 a display 109 is further provided. In a preferred arrangement, the display 109 is a LCD having high mechanical flexibility. The display 109 may be associated with signaling lights (not shown), for example a series of LED lights to give simple and intuitive signals inherent in the function of the card itself visually to the user.

Associated with the display 109 an alphanumeric keyboard 112 is provided always placed on the second face 20 of the payment card 100.

Figure 4:
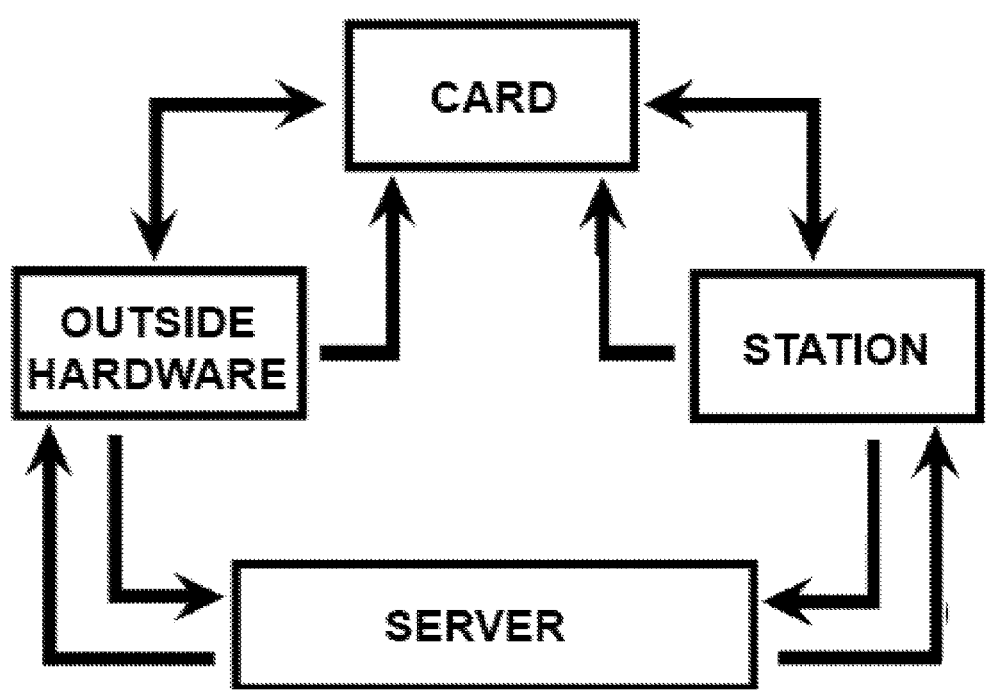
FIG. 4 shows a block diagram that shows possible interactions between the payment card, according to the invention, an outside device or station and a controlling server.
Figure 7:
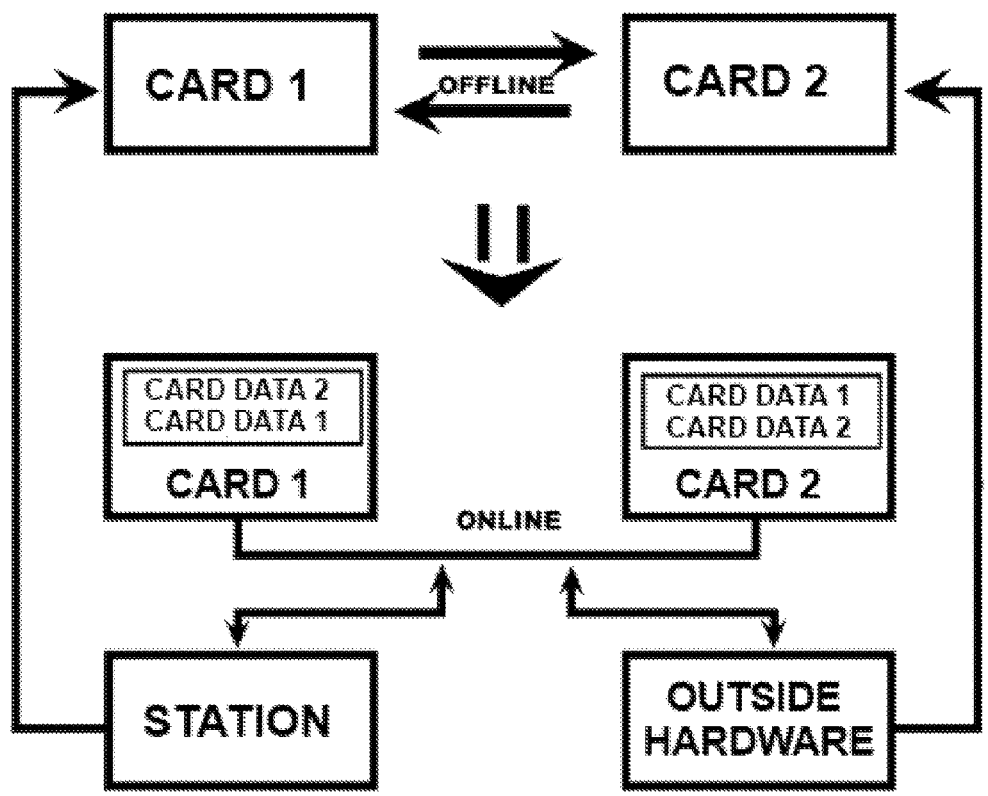
FIG. 7 shows a block diagram which shows the interactions between a first and a second payment card.

In this way, the payment card allows to view and enter data and allows the interaction thereof with a central server (FIG. 4) in which information and data relating to the payment card itself are contained in a complete way, and/or with other payment cards (FIG. 7). The processing unit 155 has the task to perform transactions ordered by the user through interaction with the alphanumeric keyboard 112 that become usable through the display 109 or the communication with other outside hardware devices.

In fact, the inner memory of the controller 150 contains only a part of data, which are updated and transferred in a constant way to the central server through the connection of the payment card 100 with outside devices that allow the connection between the payment card 100 and the central server through the above described connection port 50, and/or with wireless connections for which the card is appropriately prearranged. Furthermore, the payment card 100 can also be used in the conventional payment circuit exploiting the contact surface 170 or even through the use of RFID/NFC.

Figure 9:
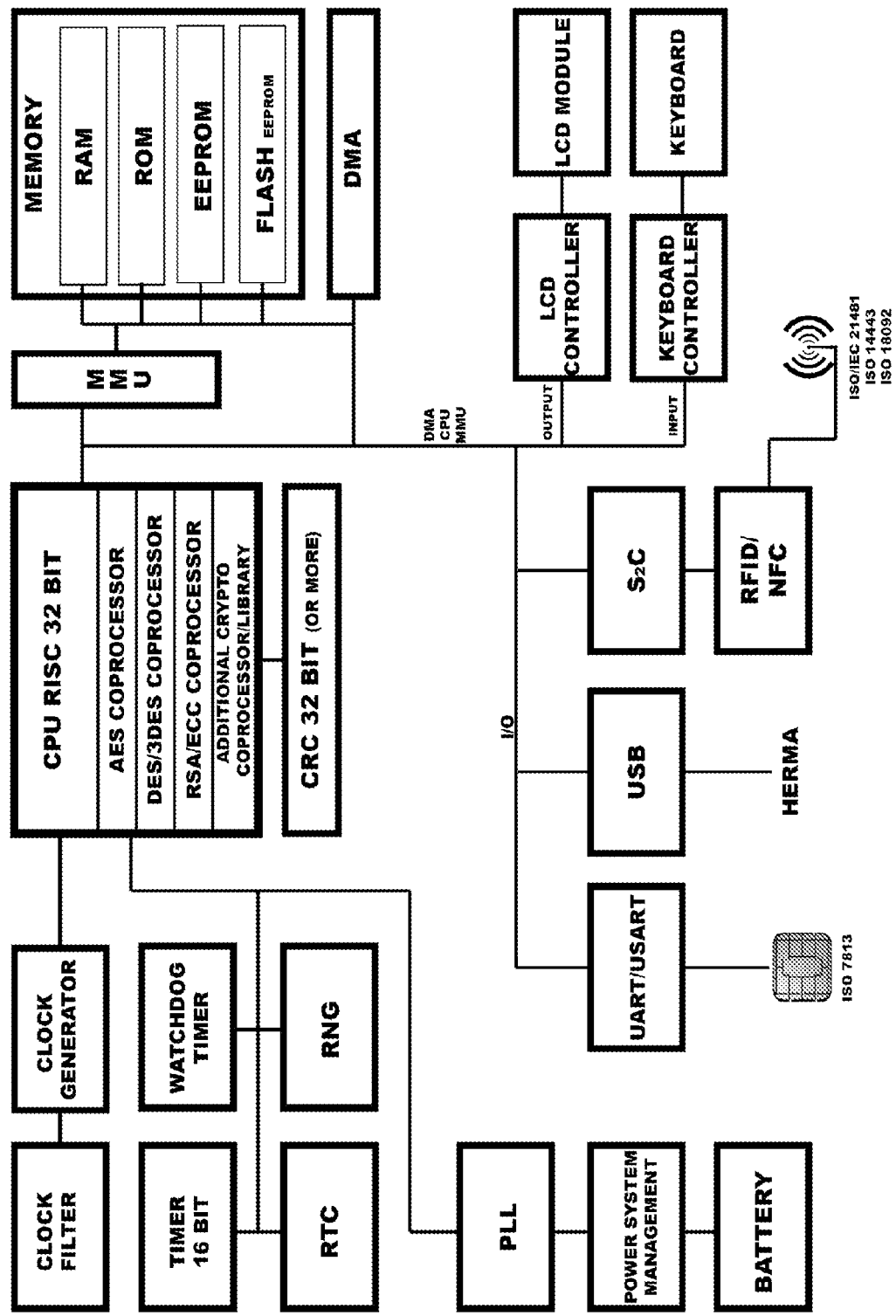
FIG. 9 shows a block diagram that identifies the components in the payment card, according to the invention.

In a preferred way, as shown in the block diagram of FIG. 9, the processing unit is a microchip or MMU (Memory Management Unit) that has the task to manage, organize and direct accesses and calls to the internal memory by the CPU. In particular, the MMU has the purpose of protecting data and making them inaccessible for unauthorized hardware or software as it acts as a MPU (Memory Protection Unit). In addition, the MMU performs the function of allocation/reallocation of portions of memory, easing the workload of the operating system and the CPU 155, thereby optimizing the performance and management of operations and optimizing at the same time the space in the memories.

In particular, the MMU is associated with a memory ROM (Read Only Memory) that offers high safety margins, in that the data contained therein, once inserted in the construction step, can no longer be changed, and this mode also makes impossible the violation/corruption of the same data by foreign systems. In addition, the ROM does not need power supply to keep the data as stored and undamaged, and this prevents the loss of highly sensitive data in case of power failure due to battery damage or due to exhaustion of the internal battery of a payment card.

Still in the preferred embodiment, associated with MMU memory one or more EEPROM (Electrically Erasable Programmable Read-Only Memory), FLASH EEPROM or FRAM (Ferroelectric Random-Access Memory) are provided; these types of memories, unlike the ROM, offer nearly the same safety features but they have the peculiarity of being able to be reprogrammed (then re-written), these memories may contain a part of the operating system (PROGRAM MEMORY), algorithms and functions that allow the conduct of the security provided for the data or to store data that need to be preserved even in the event of battery damage or power failure (DATA MEMORY).

In addition, also a type of RAM memory (Random-Access Memory) used exclusively by the operating system, and by the internal components (such as the LCD screen, keyboard, and especially the CPU) to temporarily store during a working session data waiting to be further processed, or to store data changing frequently before been permanently stored subsequently, is provided; this because, for the technological nature of RAM, it needs a continuous power to maintain the data stored, and therefore, it is used as a support by internal components during a job session. In particular the contained RAM memory is of the SRAM type (Static Random Access Memory).

In a preferred embodiment, the controller 150 further provides a computing unit for the CRC (error-detecting code), which detects anomalies in individual data/programs stored in the memory unit.

In addition, there is an RTC (Real Time Clock), which allows the unit control 150 to have always available, even in the standby mode, a hardware clock, a Clock Generator and a Clock Filter used for the synchronization and connection during data transmission. Closely related to the latter, in the preferred arrangement a PLL (Phase-Locked Loop) is inserted too, which performs the function of clock multiplier, for example, to help the computational requirements due to the complex operations performed by the encryption algorithms, to the use of a Java Virtual Machine, and during the steps of data transmission towards the internal memories of the card and the outside devices. In the described configuration, the latter is directly integrated with the Power Management System that communicates to the PPL the range of frequency with which you can work in a specific time and then by raising the level of the CPU 155, when necessary, and lowering the range of the clock in standby situations, thus obtaining a real optimization of battery consumption. In direct connection with the latter component, in the preferred arrangement is also added a voltage regulator which varies the flow (and therefore consumption) of battery energy according to the needs of processes that are performed by the processor during a given work session.

In the preferred arrangement, the controller 150 also includes 16- or 32-bit timer, and a watchdog time.

The controller 150 also includes a RNG (Random Number Generator) used to generate authentication keys for the outside device and a UART/USART component. This component converts data from a parallel format to an asynchronous serial format or vice versa. This allows the data exchange between the microprocessor/CPU/processing unit, etc. of the payment card 100 and other outside hardware (and therefore other cards) through the use of dedicated connection ports.

The payment card 100, as described above, is powered by a source that allows the operation of all electronic components. The power source is preferably a rechargeable battery of Lithium Polymer Ultrathin Cells type.

Furthermore, the payment card 100 is equipped with a Mobile Connection (independent data connection) and WIFI technology. More specifically, there is a module that houses the IEEE 802.11 protocol, which defines a set of transmission standards for WLAN networks.

In this way, the payment card 100 is able to perform all the operations of connection to the central server without the use of outside hardware and to autonomously perform operations such as real-time updating of data contained in the controller 150, recording payments card-to-card, and other operations of banking transaction.

In other words, the payment card becomes, with an adequate infrastructure, completely independent from outside hardware regarding the connection to the central server and it performs data exchange between itself and the account on the server to which the card itself refers.

According to the functional aspect of the payment card 100 described above, it allows to perform a banking transaction in accordance with the following method steps.

Figure 10:
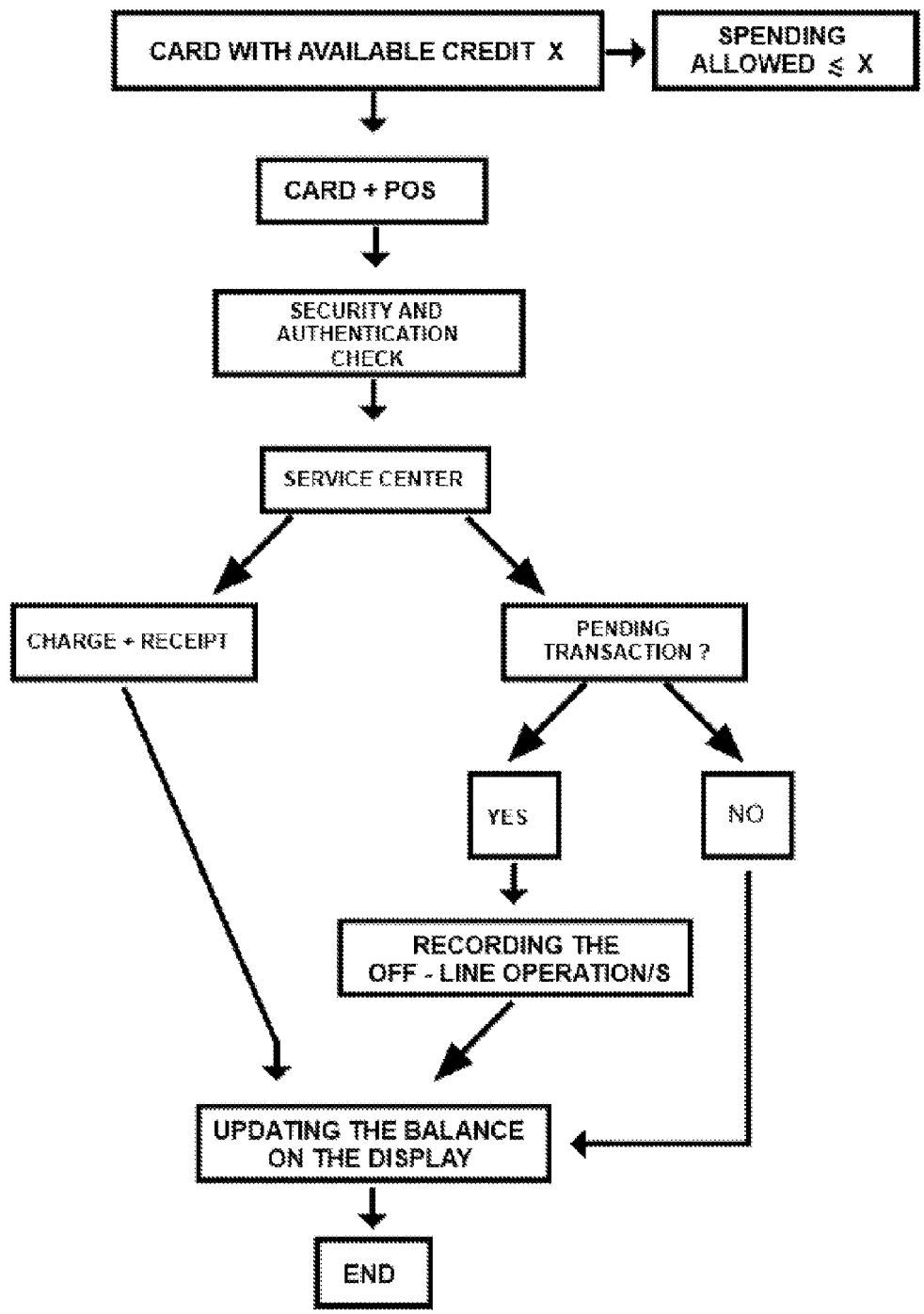
FIG. 10 shows a block diagram that identifies the steps for the payment by the payment card.

In particular the method provides, as shown in the diagram in FIG. 10, to connect the payment card 100 to a remote controlling server that performs a check of authenticity of data stored in the payment card 100 and authorize the bank transaction after this successful check of authenticity.

The controlling server sends an update signal to change the residual credit stored in the memory of the payment card 100 visible by the user directly through the display 109.

The connection can occur both by contact, through the contact surface 170 or the connection port 50, and contactless through the use of NFC/RFID technology or the like.

In a first embodiment, the payment card 100 connects to the remote controlling server with the aid of an outside device. The outside device is connected to the payment card through the hermaphrodite connection port 50. A check of the residual credit stored in the memory of payment card 100 occurs. The identification data of the payment card 100 are then sent to the central server by the outside device.

Alternatively, the payment card 100 is connected to the central server through Wi-Fi technology without the aid of an outside device. In this particular case, then the payment card is always connected to the server and updates all data in real time (i.e. ON-LINE), by recording the pending transactions and data passing between one card to another (always using the connection port 50 or through RFID/NFC) in an autonomous and instantaneous way.

In this configuration with independent data connection (Mobile connection) or WIFI, it could constitute temporary off-line mode in case of non-coverage of service and/or malfunction of the same but provided that subsequent data recording and updating of the operations performed through the payment card will be carried out as soon as the connection to the central server can be restored.

In case in which the outside device is a POS in the transaction, any pending transactions, if present, are also recorded. In addition to the Online Data Authentication, the connection to the server can also be in Offline data authentication if, for any reason, the POS is not on-line connected to the service center server of the payment circuit.

In particular, in the connecting step between the payment card 100 and the outside device, a phase of checking the identification data of the card itself is introduced. If this check fails a signaling element, such as an LED present on the payment card 100, generates an error signal and the subsequent connecting step is interrupted. If the check is successful the signaling element generates a positive signal and allows the subsequent connecting step.

On the contrary the checking step provides a step of data authentication which consists of a cryptographic checksum of Static Data Authentication (SDA), or Dynamic Data Authentication (DDA), or still Combined Data Authentication type.

Figure 11:
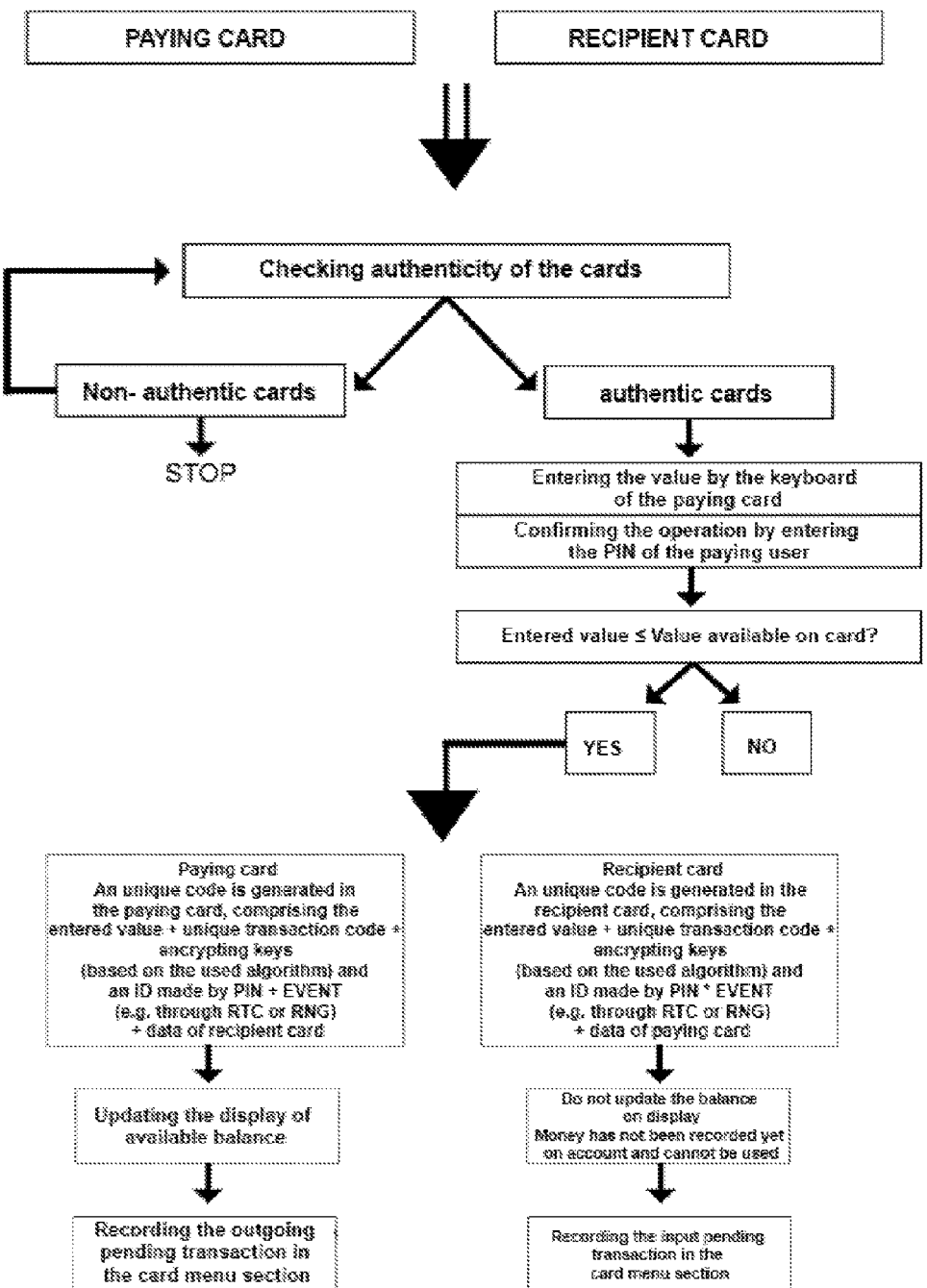
FIG. 11 shows a block diagram that identifies the steps of interaction between a first and a second payment card connected together.

In case in which the outside device is a further payment card 100 with the hermaphrodite connection port 50, there are a "paying card" and a "recipient card" connected together by means of respective connection interfaces, as shown in the block diagram of FIG. 11.

The user enters an access code Pin through the keyboard 112 of the paying card. Then the user enters the amount to be transferred in favor of the recipient card and he/she authorizes the transfer. The paying card updates the amount of residual credit scaling the amount of the transaction and makes an off-line data authentication consisting of a cryptographic checksum that, on the basis of encryption algorithms included in the card, may be Static Data Authentication (SDA), through a symmetric encryption algorithm, or a Dynamic Data Authentication (DDA), or Combined Data Authentication that are based on asymmetric cryptographic key.

In a preferred embodiment, for security reasons the card-to-card transaction prefers a CDA also known as DDA whit application cryptogram (AC) generation and uses also an OTP (One Time Password).

In fact OTP is valid for a single login session or transaction, and in this way it is not vulnerable to replication attacks unlike the traditional static passwords. The OTP generation algorithms make use of random numbers. Various methods for the generation of OTPs can be used. There is the one called Time-Synchronization using algorithms based on time synchronization between the authentication server and client that provides the password (OTPs are valid only for a short period of time) using the RTC (Real Time Clock) inside the card.

Alternatively, there is one by the utilization of mathematical algorithms that generate a new password (based on the previous password) where the OTPs are, de facto, a chain of passwords linked together, and they must be used in an predefined order (they generate a new password based on the previous password) and those (based on a challenge) using the RNG (Random Number Generator) contained inside the card, creating a random number chosen from the authentication server or the details of the transaction. These data are sent to the recipient card that stores them and inserts the amount of the transaction in the section of pending transactions of the card menu. Then at first purchase this pending transactions will be converted again into available credit through the payment circuit or at the first connection of the card with an outside device connected to the Internet through the virtual page or the reader.

Figure 12:
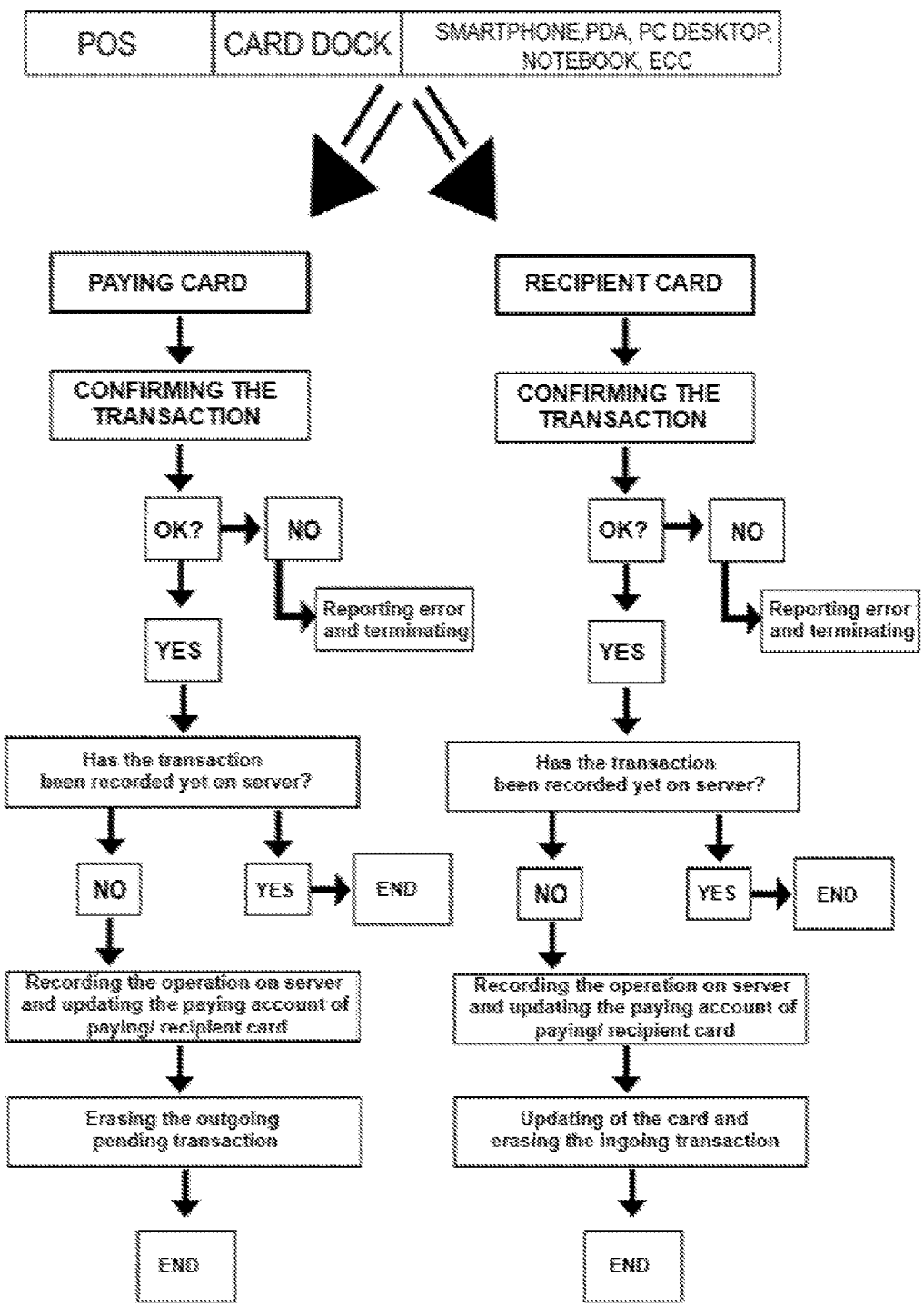
FIG. 12 shows a block diagram that identifies the steps of updating the payment cards subsequent to their connection.

When a payment card goes on-line through the payment circuit or the outside device, the card sends such data (identification data of the paying card and transaction data such as the amount, date and time and the like) to the central server that carries out in this way the transaction and records the movements on the personal page of cards involved in the transaction. With regard to the recipient digital card, the central server sends a pulse that updates the residual credit of card eliminating the pending transaction and converting it into available credit, as shown in the scheme of FIG. 12. It has to be noticed that is not important if the first card to connect during time is the paying card or the recipient card. The first card connecting to the central server records and completes the transaction completely, leaving to the card connecting at a later time only the ability of verifying and updating the transactions, for example, on a personal on-line page. In addition to the direct mode through connection port, the operation of card-to-card payment will also be possible directly through the controlling server. Once logged in a personal profile in the controlling server of the card, it is sufficient to enter the amount to be transferred and the number of card in favor of which the transfer is to be made. Also in this case the credit visible on the display 109 of the recipient payment card will be updated at the first use of the payment card for a purchase or at the first connection of the payment card to the controlling server.

It is necessary to specify that the method steps may follow a temporal succession order different from what has been described.

Figure 13:
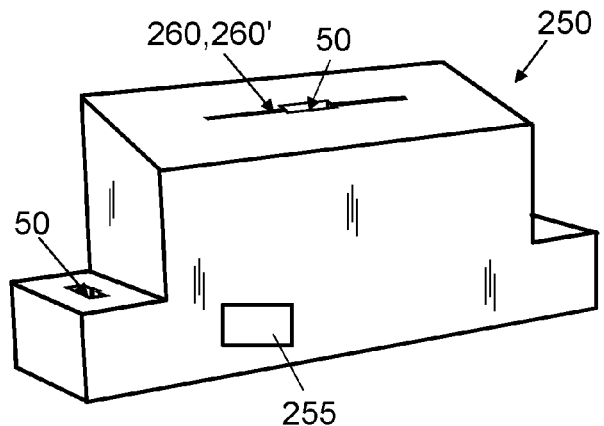
FIG. 13 shows a perspective view of a reader of the payment card according to the invention.
Figure 14:
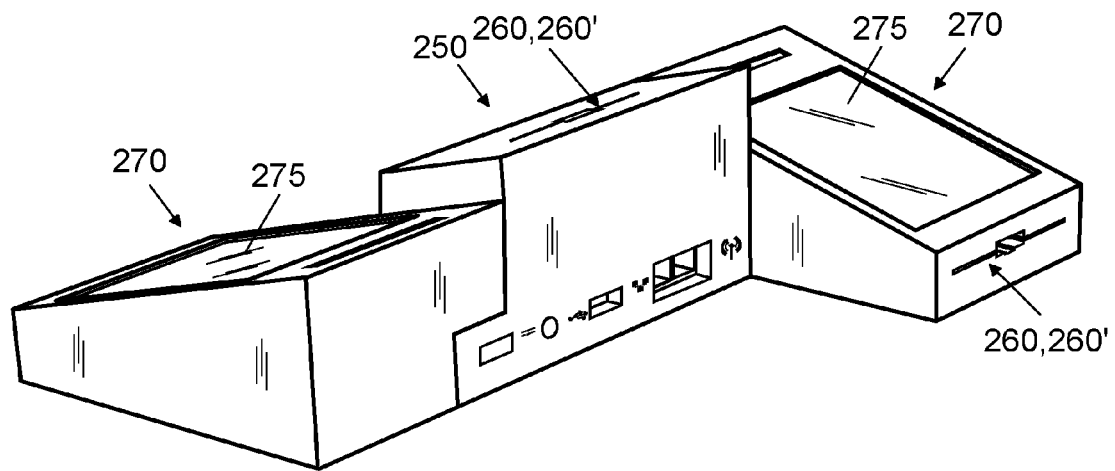
FIG. 14 shows an overall perspective view of the reader of FIG. 13 integrated with two additional components of FIG. 13A.
Figure 15:
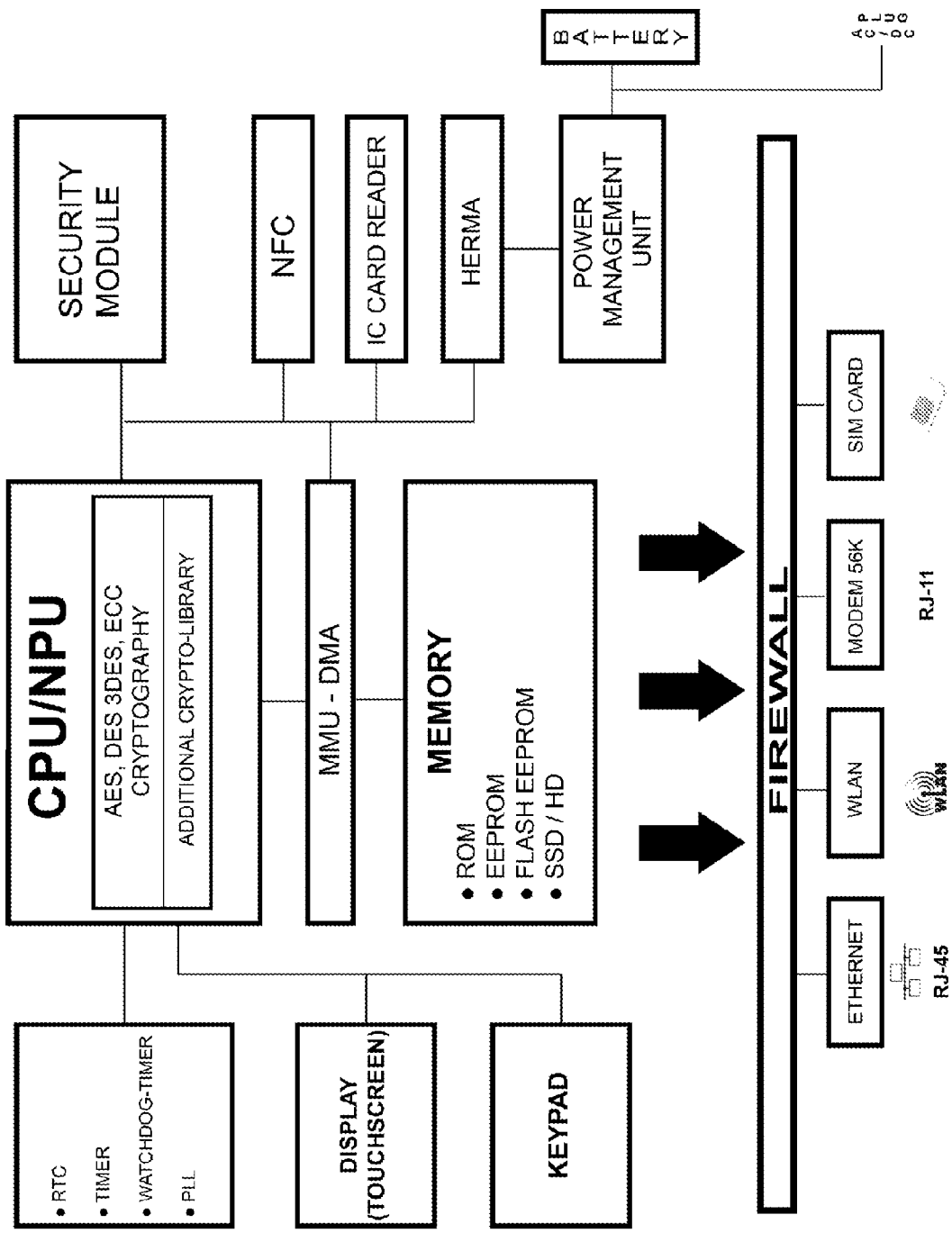
FIG. 15 shows a block diagram that shows the components present in the complete reader of FIG. 14.

In FIGS. 13 to 15, it is represented a reader or station 250 of a payment card 100 which comprises a processing unit 255, shown schematically, adapted to interface with the controller 150 present on the payment card 100. The reader or station 250 comprises at least one connection port 50 according to the present invention.

In particular, the connection port 50 on the reader is combined with a housing seat 260, 260' in which the payment card 100 is inserted. The housing seat 260, 260' includes a groove shaped to allow the insertion of a payment card 100 provided with the connection port 50. In the housing seat 260 (on a bottom wall of the same) is provided a connection port 50 not shown in detail. The shape of the housing seat 260 and the shape of the payment card 100 are complementary in shape allowing to obtain a correct and simple connection between the two connection ports 50 respectively of the reader 250 and of the payment card 100.

Once the card is inserted into the seat housing 260 and once the authentication process is performed as described above, the station 250 allows you to carry out, in addition to the usual banking transactions, also certain operations such as entering pending transactions, updating system software of the payment card, battery charging, etc.

In addition, the station 250 allows to issue a credit both to a checking account given in advance by the shopkeeper and to another payment card. In fact a housing seat 260' of the same geometry is provided, as described below, where the payment card of the shopkeeper is placed in such a way that there is an exchange of data/money directly from the user card to the shopkeeper card.

Figure 13A:
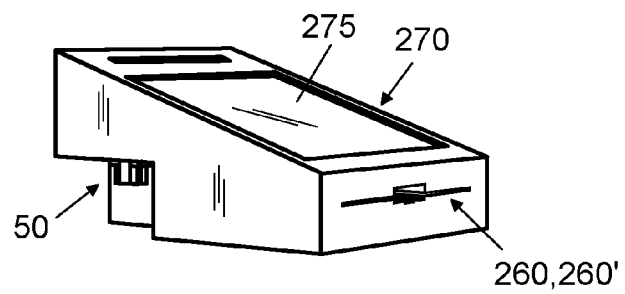
FIG. 13A shows an additional component that can be integrated the reader of FIG. 13.

In a preferred embodiment the reader includes a main module 250 shown in FIG. 13, with additional hermaphroditic connection ports 50 in order to connect secondary modules 270 (FIG. 13A). In particular, there are two secondary modules 270 connected on the side opposite to the main module 250 (FIG. 14).

The secondary modules 270 include a housing 260', a display 275 and an alphanumeric keyboard associated with the display. Alternatively, the display 275 is a touch screen, as shown in FIGS. 13A and 14.

The processing unit 255 has the task to perform the operations given by an operating system in function of the input data entered by the user through the use of the keypad (one or more) and made usable through the screen 275.

In the preferred arrangement, the architecture of the central processing unit 255 is a 32-bit (or more) RISC, created specifically for the implementation in a station of the latest generation, with such a data processing speed (1 GHz or higher) supporting all services required both by the server, with which the station communicates, and services requested by the use of the payment card.

Furthermore, the central unit 255 is designed to be able to work both in contact mode, then through the use of the hermaphrodite connection port and/or even through the use of an IC Card reader, and in contactless mode, safely and efficiently, with the use of RFID and NFC technology.

The central unit 255 of the reader 250 also contains all the functional components and characteristics described above and present in the payment card 100, singly or in combination.

As shown in the block diagram of FIG. 15, the station 250 also comprises an analog modem, an Ethernet/LAN connection port and a wireless antenna to make possible the data exchange between the central server and the network. In this way, the station 250 is able to perform transaction operations in a simple way and automatically without the aid of other outside devices.

The station 250 is also equipped with a telephone Sim card in such a way that it is independent from other types of data connection.

The station 250 is powered by an external power supply through a cable and/or individually by an internal battery that is auto-recharged when the station is connected to electricity. It is also equipped with an USB port to perform possible updates or to be connected to other outside hardware devices.

FIG. 16 shows a bracelet 200 according to the present invention, provided with a strap 201 and a seat 202 in which a payment card 100' can be removably inserted. The latter is functionally equivalent to the payment card 100 described above, with the only difference that it has a different shape, similar to that of a clock dial.

The card 100' has a hermaphrodite interface 50 and preferably a USB port, as shown in FIGS. 17 and 18, which respectively show the bracelet 200 in section and the payment card 100' in a side view. Furthermore, the card 100' preferably also has a display 109, display of the traditional or touch screen type.

The use of the bracelet 200 is simple. The user simply takes out the card 100' from the seat 202 and uses it in the same way of the card 100 described above.

In the same way the card 100' can be integrated into a key ring, a necklace, a tablet, a mobile phone, a belt, etc.

The invention claimed is:

1. Method for managing a banking transaction between two payments cards, wherein each payment card comprising:
   a) a support body having a first face and a second face opposite to one another;
   b) a controller provided with an inner memory in which identification data of a user and/or the institution issuing the payment card are stored;
   c) a connection interface operatively combined with the controller for connection with at least one outside device;
   wherein:
      i) the connection interface is a connection port of hermaphrodite type that incorporates a male portion and a female portion arranged, one with respect to the other, in such a position to allow a mechanical and operative coupling with an identical connection port of said at least one outside device:
      ii) a plurality of electric contact elements combined with the male portion and/or the female portion;
   wherein:
      both payment cards are provided with a memory and means for wireless connection and/or connection ports, the method comprising the steps of:
      exchanging data corresponding to the money sum transfer between the two cards, from the card defined as transferring card to the card defined as recipient card; storing exchanged data in the memories of both the transferring and recipient cards, and storing a security data packet;
      storing the credited amount in the memory of recipient card and making available such an amount in the future only if the following condition occurs:
      at least one from the recipient card or the transferring card must be connected at least once to the server of the related issuing institution that validates the money transfer by recording the transaction.

2. Method according to claim 1, wherein the connection to the server includes:
confirming the authenticity of data stored in the connected card;
authorizing the banking transaction when the confirm occurred;
sending, by the server, an updating signal to change the residual credit stored in the memory of the card connected thereto and, if the card has a display (109), showing the residual credit on the display.

3. Method according to claim 1, wherein the card connection to the server of the issuing institution provides for the card to be connected with an outside device by means of a connection port, or in a wireless mode, and the identification data of the payment card to be sent to the server through the outside device.

4. Method according to claim 3, wherein the outside device is a POS or ATM provided with a connection port compatible with the connection port of the card.

5. Method according to claim 3, wherein the outside device is the recipient card itself and the latter is a card or bracelet, the bracelet comprising a strap and an accommodating seat, comprising the payment card (100), which is inserted in a removable way in said receiving seat.

6. Method according to claim 1, wherein the card connection to the server is an independent data connection (Mobile Connection) or a Wi-Fi connection.

7. Method according to claim 1, wherein a step of typing an access code and money amount, to be transferred to the recipient card, is provided by means of an alphanumeric keyboard (112) of the card, followed by a step of confirming and authorizing the transfer.

8. Method according to claim 1, wherein a step of updating the residual credit available on the transferring card and the recipient card is provided, based on the transaction carried out.

* * * * *